United States Patent [19]

Sobolev et al.

[11] Patent Number: 4,692,905
[45] Date of Patent: Sep. 8, 1987

[54] METHOD FOR GEOPHYSICAL PROSPECTING OF COMPLEX OREBODIES

[75] Inventors: Gennady A. Sobolev; Vladislav M. Demin; Vladimir F. Los; Zinovy-Jury Y. Maibuk, all of Moscow, U.S.S.R.

[73] Assignee: Institut Fiziki Zemli Imeni O.Ju. Shmidta Akademii Nauk SSSR, Moscow, U.S.S.R.

[21] Appl. No.: 863,380

[22] PCT Filed: Aug. 21, 1984

[86] PCT No.: PCT/SU84/00048
§ 371 Date: Apr. 11, 1986
§ 102(e) Date: Apr. 11, 1986

[87] PCT Pub. No.: WO86/01609
PCT Pub. Date: Mar. 13, 1986

[51] Int. Cl.$^4$ .............................................. G01V 3/00
[52] U.S. Cl. .................................... 367/14; 181/108; 324/323
[58] Field of Search ........................... 367/14, 37, 15; 181/108, 112; 324/323

[56] References Cited

U.S. PATENT DOCUMENTS 3,524,129  8/1970  Ikrath ................................. 324/323
3,621,380 11/1971  Barlow, Jr. ..................... 324/323 X

FOREIGN PATENT DOCUMENTS 168812 12/1965 U.S.S.R. .
330411  4/1972 U.S.S.R. .
873190 10/1981 U.S.S.R. .
890349 12/1981 U.S.S.R. ............................. 324/323
960699  9/1982 U.S.S.R. .
972453 11/1982 U.S.S.R. .
1038917  8/1983 U.S.S.R. ............................. 324/323
1041973  9/1983 U.S.S.R. ............................. 324/348

OTHER PUBLICATIONS

S. N. Kondrashev, "Piezoelectric Methods of Prospecting", Nedra Publishing House, Moscow 1980, pp. 37–39.
"Electrical and Mechanical Properties of Rocks Under High Pressure" USSR Academy of Science Transactions of the Institute of the Earth Physics, No. 37 (204), Nauks Publishing House, Moscow 1966, pp. 221–227.
Sobolev et al, "Electromechanical Phenomena in the Earth", USSR Academy of Science Institute Fiziki Zemli, Nauka Publishing House, Moscow 1980, pp. 91–97.

Primary Examiner—Deborah L. Kyle
Assistant Examiner—John E. Griffiths
Attorney, Agent, or Firm—Lilling & Greenspan

[57] ABSTRACT

A method for geophysical prospecting of complex orebodies, wherein elastic waves are excited at least two times in the rock mass containing orebodies and the radio-frequency electromagnetic pulses produced by said orebodies are recorded during each excitation to pinpoint the arrival time of the first and last pulses in each pulse train (1,2,3,4,5,6), then the difference is found between the maximum arrival time of the last pulse and the minimum arrival time of the first pulse in the pulse trains (1,3,5 and 2,4,6) representing one orebody, said differences being the basis for determination of the thickness of each orebody.

1 Claim, 1 Drawing Figure

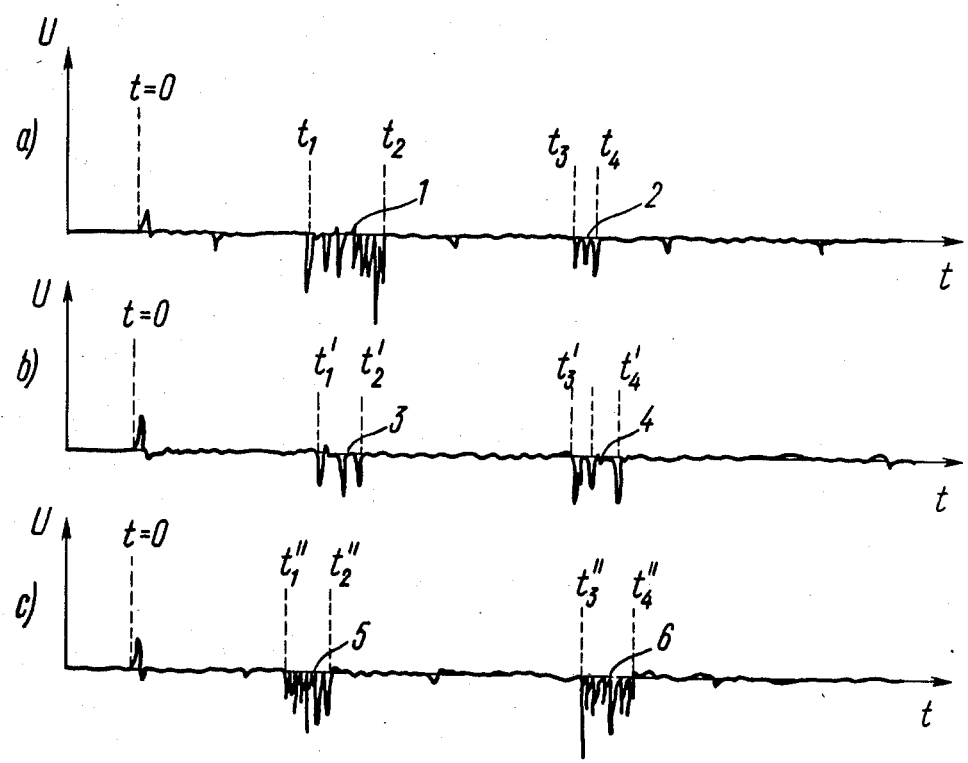

4,692,905

METHOD FOR GEOPHYSICAL PROSPECTING OF COMPLEX OREBODIES

FIELD OF THE INVENTION

This invention relates to geophysical methods of prospecting mineral deposits, using seismic prospecting and radio-wave prospecting and is particularly concerned with a method for geophysical prospecting of complex or polymetallic orebodies.

PRIOR ART

The spatial distribution of complex orebodies within the rock mass is fairly complicated. To be suitable for industrial exploitation, the thickness of an orebody should comply to various criteria, including the value of the mineral or mineral complex. Sometimes, even centimeter-thick orebodies are worth exploiting, while in other mining conditions the minimum thickness of orebodies whose exploitation is economically profitable exceeds tens or even hundreds of centimeters. It is important, therefore, that geophysical prospecting concentrates to define the thickness of orebodies.

Traditionally, the thickness of complex orebodies was the subject of geological methods, such as exploratory workings, drilling a series of prospecting holes to obtain cores whose composition is indicative of the thickness of the orebody cut by the hole. The usual distance between holes is about 20 meters. This method is obviously labour-intensive, lengthy and costly, but nevertheless insufficiently effective. With an elaborate configuration of some orebodies, some holes may pass in constrictions of such orebodies resulting in poor correlation of the data obtained in two adjacent holes.

Some geophysical methods can be used to produce orebody thickness estimates without hole drilling or exploratory workings. Based on the known phenomena of piezoelectric polarization of the rocks which are piezoelectrics, is a method for piezoelectric prospecting of quartz-bearing orebodies. The use of this method permits determination of the quartz vein thickness by the duration of the electromagnetic pulse generated by the quartz-bearing orebody when it is excited by an elastic wave/cf., for example, G. A. Sobolev, V. M. Demin, Mechano-Electric Fenomena in Earth, published in 1980 by Nauka Publ., p. 91, in Russian/.

But this method is unsuitable for determination of the thickness of complex orebodies having insignificant amounts of piezoelectric minerals, such as quartz or sphalerite, or having no piezoelectric minerals at all, since polymetallic orebodies generate no electromagnetic radiation based on piezoelectric phenomena. To conclude, it can be said that the known method cannot be used for prospecting the majority of polymetallic deposits in the USSR and other countries.

Also known in the art is a method for geophysical prospecting of complex or polymetallic orebodies having no piezoelectric effect, which consists in that elastic waves are excited in the rock mass containing orebodies at least twice, and then the arrival time of the first pulse of each pulse train of the radio-frequency radiation which is generated by the orebodies, the number of pulse trains during one excitation period being equal to the number of orebodies (cf., Inventor's Certificate No. 972 453, filed Mar. 4, 1981, published Nov. 7, 1982, in the bulletin "Discoveries, Inventions, Industrial Designs and Trademarks", No. 41, IPC$^3$ G 01V 11/00). This method permits determination of the existance of an orebody having no piezoelectric properties, and is based on the comparison of the duration and amplitudes of electromagnetic signals in the low frequency and high frequency ranges.

But this method cannot be used to define the thickness of complex orebodies.

DISCLOSURE OF THE INVENTION

It is an object of the invention to provide a method for geophysical prospecting of polymetallic or complex orebodies, which can be used to determine the thickness of complex orebodies deposited in the rock mass.

This object is achieved by that in a method for geophysical prospecting of complex orebodies, consisting in that elastic waves are excited at least twice in the rock mass containing orebodies, the arrival time of the first pulse in each train of pulses of electromagnetic radiorange radiation generated by orebodies is registered, the number of pulse trains at each excitation being equal to the number of orebodies, according to the invention, the arrival time of the last pulse in each train of pulses of electromagnetic radiation is registered as each elastic wave is excited, and the difference is determined between the maximum arrival time of the last pulse and the minimum arrival time of the first pulse of the pulse trains corresponding to one orebody, said differences being indicative of the thickness of each such orebody.

The complex orebody is known to generate, when excited by elastic waves of the audio-frequency range, electromagnetic pulsed radiation within the range from kilocycles to megacycles. Each pulse occurs in the point of an orebody, where the elastic wave causes a microdestruction. When the orebody is excited by the elastic wave from the same shotpoint for the second time, microdestructions occur in other places of the orebody, that is the source of electromagnetic pulses within one body changes its position. Usually, one elastic wave excited in an orebody produces several tens of pulses registered on the oscillogram as a train of pulses.

With different sources of electromagnetic pulses, the time of arrival and disappearance of pulses in a train varies in each excitation cycle. The rock mass has to be excited by elastic waves at least two times in order to define the true thickness of a polymetallic orebody. In practical terms, good repeatability can be achieved by a series of 5 or 6 excitations.

The method for geophysical prospecting of complex orebodies according to the invention offers a conviently fast, accurate and inexpensive technique for determination of the thickness of orebodies deposited in the rock mass under investigation.

BRIEF DESCRIPTION OF THE DRAWINGS

The invention will now be described in greater detail with reference to a specific example of realization of the proposed method for geophysical prospecting of complex orebodies, taken in conjunction with the accompanying drawing illustrating time diagrams a, b and c of electromagnetic pulsed radiation originated in orebodies, respectively, by the first excitation by elastic waves, by the second excitation by elastic waves, and by the third excitation by elastic waves, according to the invention.

BEST MODE FOR CARRYING OUT THE INVENTION

The method for geophysical prospecting of complex orebodies according to the invention consists in the following.

Elastic waves are excited in the rock mass to be investigated at least two times. The electromagnetic pulsed radiation produced by orebodies under the impact of these elastic waves is recorded. The number of pulse trains during each excitation is equal to the number of orebodies. The arrival time of the first and last pulses in each pulse train in each elastic wave excitation is measured. The arrival times are compared to determine the difference between the maximum arrival time of the last pulse and the minimum arrival time of the first pulse in the pulse trains which correspond to one orebody.

The thickness H of each orebody is calculated according the formula:

$$H_k = (t_{max}^j - t_{min}^i)\overline{V},$$

where $t_{max}^j$ is the maximum arrival time of the last pulse during the j-th shot;

$t_{min}^i$ is the minimum arrival time of the first pulse during the i-th shot;

$\overline{V}$ is the mean velocity of the elastic wave in the orebody, known from references or parametric measurements.

$H_k$ is the thickness of the k-th orebody, where $j = 1, 2 \ldots n$, $i = 1, 2 \ldots n$, and $k = 1, 2, \ldots n$.

The electromagnetic radiation detected in this manner is peculiar in that, with repeated excitation of the orebody by elastic waves, new regions thereof are excited. In consequence, the arrival time of the first and last pulses corresponding to one orebody vary with each excitation. The thicker the orebody, the larger the number of excitations required to obtain a reliable figure. Good repeatability is only achieved with a series of 5 or 6 runs.

Elastic waves in the rock mass are excited by exploding a charge whose power varies with the volume of the rock mass, mineral composition of prospected orebodies and conditions for propagation of elastic waves in the rock mass being investigated.

The ammonite charge, for example, can range from 200 to 10 kg. The radius of prospected rock mass ranges from tens to hundreds of meters from the shotpoint. Smaller rock masses, from 10 to 20 m, can be prospected by elastic waves from non-explosive sources, Vibroseis, for example.

The method for geophysical prospecting of complex orebodies according to the invention is described hereinbelow by way of an example where triple excitation of elastic waves in the rock mass is used.

The explosive charge is placed in a hole bored either from the ground surface or a lateral working. Electromagnetic pulsed radiation of the radio-frequency range from kilo- to megacycles is produced in polymetallic orebodies under the impact of the elastic wave.

The equipment for reception and registration of electromagnetic pulses produced by orebodies can be located in any working near the rock mass to be prospected but not more than 400 m from the shotpoint.

Referring to the time diagrams of the electromagnetic pulsed radiation, the output voltage (U) of the recording equipment measured in volts is plotted on the ordinate, while time (t) in microseconds is plotted on the abscissa.

Electromagnetic radiation of orebodies is represented by trains 1, 2, 3, 4, 5 and 6 noise-like signals composed of short pulses having different amplitude and polarity.

During the first excitation of elastic waves, two pulse trains 1 and 2 can be distinguished on the time diagram "a", two pulse trains 3 and 4 on the time diagram "b", and two pulse trains 5 and 6 on the time diagram "c", with the shot instant $t = 0$.

The number of pulse trains in each excitation is equal to the number of orebodies in the rock mass being prospected. The diagrams indicate that the rock mass of the example contains two orebodies. The first body produces pulse trains 1, 3, 5, while the second body produces pulse trains 2, 4, 6.

The next operation is to determine the arrival time of the first pulses and of the last pulses in each pulse train 1, 2, 3, 4, 5, 6 during each excitation.

For the first excitation of elastic waves:

$t_1$ is the arrival time of the 1-st pulse of the train 1;

$t_2$ is the arrival time of the last pulse of the train 1;

$t_3$ is the arrival time of the 1-st pulse of the train 2;

$t_4$ is the arrival time of the last pulse of the train 2.

For the second excitation of elastic waves:

$t_1'$ and $t_3'$ are arrival times of the first pulses and $t_2'$ and $t_4'$ are arrival times of the last pulses of the pulse trains 3 and 4, respectively.

For the third excitation of elastic waves:

$t_1''$ and $t_3''$ are arrival times of the first pulses, and $t_2''$ and $t_4''$ are arrival times of the last pulses of the pulse trains 5 and 6, respectively.

The next step is to determine the minimum arrival time, $t_{min}$, of the first pulse and the maximum arrival time, $t_{max}$, of the last pulse in the pulse trains which correspond to one orebody.

For the first orebody: $t_{min} = t_1''$, $t_{max} = t_2$.

For the second orebody: $t_{min} = t_3'$, $t_{max} = t_4''$.

The thickness of the first orebody is found according to the formula:

$$H_1 = (t_2 - t_1'')\overline{V}.$$

The thickness of the second orebody is equal to:

$$H_2 = (t_4'' - t_3')\overline{V}.$$

To calculate the thickness of an orebody, the mean elastic wave velocity, $\overline{V}$, is used. It can be found in reference books or determined for the purpose by means of special parametric measurements by known ultrasonic inspection techniques.

The thickness of an orebody can be found in one working shift by using the method according to the invention, while conventional geological techniques involve drilling of several holes lasting for 1 or even 2 weeks.

For better understanding of the proposed method, some concrete examples are given below.

EXAMPLE 1

Geophysical prospecting of polymetallic orebodies was carried out on a complex ore deposit in order to find out the amount and thickness of orebodies contained in the rock mass being investigated.

Elastic waves were excited by three explosions of ammonite charges (8 kg). The recording equipment was placed at a distance of 300 m from the shotpoint.

Two pulse trains 1 and 2 were recorded during the first excitation of elastic waves. The arrival times of the first and last pulses in the first pulse train 1 were:

$t_1 = 3.2$ milliseconds and $t_2 = 4.6$ msec, and in the second pulse train 2 were:

$t_3 = 8.1$ msec and $t_4 = 8.55$ msec.

The arrival times during the second shot were:

$t_1' = 3.4$ msec, $t_2' = 4.25$ msec, $t_3' = 8.15$ msec, $t_4' = 9.05$ msec.

The arrival times during the third shot were recorded in the pulse trains 5 and 6. They were: $t_1'' = 2.9$ msec, $t_2'' = 3.7$ msec, $t_3'' = 8.4$ msec, $t_4'' = 9.35$ msec.

The thickness of the orebody producing the pulse trains 1,3 and 5 are found by defining the difference between the minimum arrival time $t_1'' = 2.9$ msec and the maximum arrival time $t_2 = 4.6$ msec, respectively.

With the mean elastic velocity known to be equal to 5.2 m/sec, the thickness of the first orebody was:

$H_1 = (4.6 - 2.9)5.2 = 8.35$ m.

For the second orebody producing the pulse trains 2,4 and 6, the minimum arrival time $t_3 = 8.1$ msec and the maximum arrival time $t_4'' = 9.35$ msec of the first and last pulses, respectively, were sufficient to obtain the thickness of the orebody $H_2 = 6.5$ m.

EXAMPLE 2

Another deposit of polymetallic ores was prospected to find orebodies and determine their thickness. Six kilogram ammonite charges were exploded at a point located 350 m from the recording equipment. Three trains of electromagnetic pulses were recorded after the first shot within the range from 0.2 to 3.0 megacycles, which indicated three different orebodies. The arrival time of the first and last pulses in each train were as follows:

1-st pulse train: $t_1 = 3.3$ msec, $t_2 = 3.6$ msec;
2-nd pulse train: $t_3 = 13.6$ msec, $t_4 = 16.4$ msec;
3-rd pulse train: $t_5 = 18.6$ msec, $t_6 = 19.0$ msec.

The average elastic wave velocity in orebodies of this locality was 5 m/msec.

A preliminary estimate of the thickness of three orebodies was made on the basis of the first explosion.

$H_1 = (3.6 - 3.3)5 = 1.5$ m;

$H_2 = (16.4 - 13.6)5 = 14$ m;

$H_3 = (19.0 - 18.6)5 = 2$ m.

After four more explosions, the minimum and maximum arrival time were calculated for each pulse train representing the first, second and third orebodies.

1-st orebody: $t_{min} = 3.3$ msec, $t_{max} = 4.2$ msec;
2-nd orebody: $t_{min} = 13.6$ msec, $t_{max} = 17.5$ msec;
3-rd orebody: $t_{min} = 18.4$ msec, $t_{max} = 19.2$ msec.

The thickness of each said orebody was calculated to be as follows:

$H_1 = 4.5$ m; $H_2 = 19.5$ m; $H_3 = 4.0$ m.

These data were checked by drilling and subsequent exploitation of the ore deposits. It turned out that the thickness determined by the method according to the invention deviated some 5-10 percent from the true figures, which is a satisfactory result for prospecting such orebodies.

INDUSTRIAL APPLICABILITY

This method for geophysical prospecting of complex ores is used at the stage of searching and prospecting of complex orebodies comprising tin, lead, gold, zinc, mercury, molybdenum, tungsten, antimony, and rare-earth metals.

We claim:

1. A method for geophysical prospecting comprising the steps of exciting, at least two times, elastic waves in ground containing orebodies and recording arrival time of a first pulse of each pulse train of electromagnetic radiation in the radio frequency range generated by the orebodies, the number of these pulse trains during each excitation being equal to the number of orebodies, characterized by recording the arrival time of the last pulse of each pulse train (1,2,3,4,5,6) resulting from each excitation of elastic waves, then calculating the difference between the maximum arrival time of the last pulses and the minimum arrival time of the first pulses of the pulse trains (1,3,5 and 2,4,6) representing one orebody, and determining, based on said difference, the thickness of said one orebody.

* * * * *